United States Patent
Hatoh et al.

(10) Patent No.: US 6,830,840 B1
(45) Date of Patent: Dec. 14, 2004

(54) OPERATION METHOD FOR POLYMER ELECTROLYTIC FUEL CELL

(75) Inventors: Kazuhito Hatoh, Osaka (JP); Osamu Sakai, Neyagawa (JP); Hideo Ohara, Katano (JP); Junji Niikura, Hirakata (JP); Hisaaki Gyoten, Shijonawate (JP); Toshihiro Matsumoto, Ibaraki (JP); Teruhisa Kanbara, Ikeda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/019,975
(22) PCT Filed: Apr. 17, 2000
(86) PCT No.: PCT/JP00/02506
§ 371 (c)(1),
(2), (4) Date: Oct. 23, 2001
(87) PCT Pub. No.: WO00/65678
PCT Pub. Date: Nov. 2, 2000

(30) Foreign Application Priority Data

Apr. 26, 1999 (JP) .......................................... 11-117620

(51) Int. Cl.[7] ................................................ H01M 8/04
(52) U.S. Cl. ........................................... 429/13; 429/24
(58) Field of Search ............................. 429/13, 24, 75, 429/30

(56) References Cited

FOREIGN PATENT DOCUMENTS

| JP | 07263010 A | 10/1995 | |
| JP | 08111230 A | 4/1996 | |
| JP | 8-111230 | * 4/1996 | ............ H01M/8/10 |
| JP | 10003936 A | 1/1998 | |
| JP | 10255828 A | 9/1998 | |

* cited by examiner

*Primary Examiner*—Mark Ruthkosky
(74) *Attorney, Agent, or Firm*—Akin Gump Strauss Hauer & Feld,L.L.P.

(57) ABSTRACT

The present invention discloses an operation method for a polymer electrolyte fuel cell in an optimum operating condition by regulating the cell by a function represented by a gas flow rate and the difference between a saturated steam pressure and an actual steam pressure, by regulating an in-plane temperature distribution obtained by a cooling water flow direction and by the regulations of a cooling water inlet temperature and a cooling water flow amount; a gas supply amount; a supplied moisture amount; and a current density.

3 Claims, 7 Drawing Sheets

OPERATION METHOD FOR POLYMER ELECTROLYTIC FUEL CELL

TECHNICAL FIELD

The present invention relates to a polymer electrolyte fuel cell of the room temperature operation type, which is used for a portable power supply, a power supply of electric cars, a domestic cogeneration system, or the like.

BACKGROUND ART

A polymer electrolyte fuel cell produces both electric power and heat at the same time by making a hydrogen-containing fuel gas and an oxygen-containing oxidizing gas such as air react electrochemically. The fuel cell is fabricated as follows. First, a catalytic reaction layer mainly composed of carbon powder carrying a platinum type metallic catalyst is formed on both sides of a polymer electrolyte membrane which selectively transports hydrogen ions. Then, a diffusion layer provided with both permeability for the fuel gas or the oxidizing gas and electron conductivity is formed on the outer surface of each catalytic reaction layer. The catalytic reaction layer and this diffusion layer integrally function as an electrode. The assembly comprising the electrodes and the electrolyte membrane called as an MEA (Membrane Electrolyte Assembly).

Then, in order to avoid the supplied gases from leaking outside the fuel cell, or the fuel gas and the oxidizing gas from mixing each other, gaskets are arranged around the electrode in such a manner as to sandwich the polymer electrolyte membrane. The gaskets may be previously formed to be integral with the electrode and the polymer electrolyte membrane, and the integrated body is called an MEA in some cases.

Furthermore, a conductive separator plate is provided outside the MEA to fix the MEA mechanically and to connect adjacent MBAs electrically in serial. At the portions of the separator plate that are in contact with the MEAs, gas channels are formed to supply reaction gases to and to carry away a produced gas or excessive gases from the surfaces of the electrodes. The gas channel could be provided individually and separately from the separator plate; however, it is common that a groove is made on the surface of the separator plate and used as the gas channel.

In general, in the actual use of a fuel cell, a laminated structure where a plurality of the above-mentioned unit cells is stacked is adopted. During the operation of the fuel cell, not only electric power but also heat is produced; in the laminated structure, a cooling plate is provided for every one or two unit cells to make it possible to keep the cell temperature constant and to use the produced heat energy in the form of hot water or the like. The common structure of a cooling plate is composed of a thin metallic plate and a heat medium such as cooling water circulating through inside thereof. Moreover, there is another structure where channels are provided on the rear side of the separator which composes a unit cell, i.e., on the side where the cooling water is intended to circulate, thereby making the separator plate function as the cooling plate. In this case, an O-ring or a gasket are needed for sealing a heat medium such as cooling water. In this sealing method, it is necessary to secure sufficient electrical conductivity between the top and bottom of the cooling plate by completely compressing the O-ring or the like.

Furthermore, in such a laminated structure, apertures called manifolds to provide and discharge the fuel gas to and from each unit cell are necessary. As the manifolds, the common one is a so-called internal manifold type provided with apertures for supplying and discharging cooling water inside the cell stack.

Which of the internal manifold type or the external manifold type may be used, it is necessary that the plurality of unit cells including cooling plates is stacked in one direction; a pair of end plates are arranged at both ends of the stacked cell; and the stacked cell is pressed and fixed from outside the two end plates by using a fastening rod. In the fastening, it is preferable to fasten the unit cells as uniformly as possible within the plane thereof. From the viewpoint of mechanical strength; the end plates and the fastening rod are usually made from a metallic material such as stainless steel. These end plates and the fastening rod are electrically isolated from the stacked cell by an insulating plate so as to produce a structure where there is no current leakage outside through the end plates. As for the fastening rod, it has been suggested to penetrate it through a through-hole inside the separator and to fasten the whole stacked cell including the end plates by means of a metallic belt.

In the aforementioned polymer electrolyte fuel cell the electrolyte membrane functions as an electrolyte when it contains some water and, therefore, it is necessary to moisturize and supply the fuel gas and the oxidizing gas. In; addition, the polymer electrolyte membrane has the effect of increasing the ion conductivity thereof with increasing water content, thereby reducing the internal resistance of the cell, and exhibiting high performance at least within a temperature range up to 100° C. Therefore, in order to increase the water content in the electrolyte membrane, it is necessary to supply the supplied gas after being highly moisturized.

However, supplying an excessively moisturized gas at the cell operating temperature causes condensed water inside the cell, and the water drops disturb a smooth gas supply. Furthermore, on the electrode (air electrode) side to which the oxidizing gas is supplied, electric power generation produces water, thereby causing a problem that the efficiency of eliminating the produced water decreases, and the cell performance deteriorates. For this, it is general that a moisturized gas having a dew point slightly lower than the cell operating temperature is prepared and supplied into the cell.

Commonly used as methods for moisturizing a gas are a bubbler moisturizing system where a gas is supplied to deionized water maintained at a predetermined temperature and moisturized by ventilating (bubbling), and a membrane moisturizing system where deionized water maintained at a predetermined temperature is flown on one side of a membrane such as an electrolyte membrane, which allows water to move easily, whereas a gas is flown on the other side to moisturize a gas. When a gas prepared by steam reforming a fossil fuel such as methanol or methane is used as a fuel gas, there are cases where moisturizing is unnecessary because steam is contained in the reformed gas.

The moisturized fuel and oxidizing gases are supplied to the polymer electrolyte fuel cell and used for electric power generation. At this time, in a single plane of any unit cell in the stacked cell, a current density distribution occurs.

To be more specific, the fuel gas is moisturized in a predetermined manner at the gas supplying inlet and supplied; however, hydrogen in the fuel gas is consumed in electric power generation, Which causes a phenomenon that a hydrogen partial pressure is high and a steam partial pressure is low in the upstream parts of the fuel gas, whereas the hydrogen partial pressure is low and the steam partial pressure is high in the downstream parts of the fuel gas. Furthermore, the oxidizing gas is also moisturized in a predetermined manner at the gas supplying inlet and supplied; however, oxygen in the oxidant gas is consumed in electric power generation, and water is produced by electric power generation, which brings about a phenomenon that the oxygen partial pressure is high and the steam partial pressure is low in the upstream parts of the oxidizing gas, whereas the oxygen partial pressure is low and the steam partial pressure is high in the downstream parts of the oxidizing gas. Moreover, the temperature of the cooling water for cooling the cell becomes low on the inlet side and high on the outlet side of the fuel cell so as to cause a temperature distribution in a single plane of a unit cell. From these reasons, in a single plane of the cell, a current density distribution (performance distribution) occurs.

When an unevenness of the hydrogen and steam partial pressures in the fuel gas; an unevenness of the oxygen and steam partial pressures in the oxidizing gas; and a temperature distribution in a single plane of the cell, which are caused by the above-mentioned reasons become too large and go out of an optical condition, an extremely dry (over dry) condition or an extremely wet (over flooding) condition occurs, which can not be settled only by the occurrence of a current density distribution, and sometimes makes the cell fail to function as a cell.

In addition, there could be another phenomenon that an over dry and an over flooding coexist in a single plane of the cell due to an unevenness of the hydrogen and steam partial pressures in the fuel gas, an unevenness of the oxygen and steam partial pressures in the oxidizing gas, and a temperature distribution in a single plane of the cell, which are caused by the above-mentioned reasons.

When the stacking number of the stacked cell is increased, the occurrence of the above-mentioned problem in a part of the plurality of stacked unit cells will make the unit cells with decreased performance interfere with the operation of the entire stacked cell. To be more specific, when a part of the stacked unit cells falls into the over flooding condition, the cells suffering from the over flooding increase a pressure loss for gas supply.

Since the manifolds for gas supply are shared by all unit cells in the stacked cell, the presence of a unit cell fallen into the over flooding makes it harder for the gas to be supplied to the other unit cells, which may cause the over flooding to the stacked cell as a whole.

On the other hand, when a partial unit cell of the stacked cell falls into an over dry, the pressure loss for gas supply decreases in the unit cell fallen into the over dry. Consequently, the gas is flown more easily to the stacked cell fallen into an over dry, thereby causing an over dry more easily.

The above-described problem often results from the steam partial pressure in the gas becoming higher on the gas outlet side than on the gas inlet side, whether it may be on the fuel electrode side to supply the fuel gas or on the air electrode side to supply the oxidizing gas. Therefore, as disclosed in Japanese Unexamined Patent Publication No. Hei 9-511356, it has been tried to suppress the over flooding in the downstream parts of the air electrode and to reduce a current density distribution in a single plane of the cell, by making an oxidizing gas flow direction and a cooling water flow direction the same and also by making the temperature in the downstream parts of the oxidizing gas higher than in the upstream parts by means of a temperature distribution of the cooling water.

However, there is always a pressure loss at the gas inlet when a gas is supplied to the stacked cell and, therefore, there is a pressure distribution of the supplied gas inside the stacked cell, always making the inlet side higher in pressure. On the air electrode side, water is generated to make the steam partial pressure higher as the steam gets closer to the outlet side; however, the relative humidity may not necessarily be higher on the outlet side due to the influence of the pressure distribution, depending on the cell operating condition. Therefore, when the cell is powered at such an operating condition that the relative humidity closer to the inlet side gets higher; the oxidizing gas flow direction and the cooling water flow direction are made the same; and the temperature in the downstream parts of the oxidizing gas is made higher than in the upstream parts by means of a temperature distribution of the cooling water, the over flooding on the gas inlet side is facilitated, thereby producing a reverse effect.

DISCLOSURE OF INVENTION

In order to solve the above-mentioned problems, the present invention provides an method for operating a polymer electrolyte fuel cell comprising, a pair of electrodes sandwiching a polymer electrolyte membrane, a conductive separator, means for supplying and discharging a fuel gas and an oxidizing gas to and from the electrodes, a moisturizing means for the fuel gas and/or the oxidizing gas, and means for circulating cooling water in a plane direction parallel to the electrodes, the method comprising the steps of:

measuring at least one physical quantity selected from the group consisting of a gas flow rate of the fuel gas, a gas flow rate of the oxidizing gas, a saturated steam pressure in the fuel gas, a steam pressure in the fuel gas, a saturated steam pressure in the oxidizing gas, a steam pressure in the oxidizing gas, a temperature of the electrode and an output current value;

regulating at least one physical quantity selected from the group consisting of a flow direction of the cooling water, a temperature of the cooling water, a flow amount of the cooling water, a supply amount of the fuel gas, a supply amount of the oxidizing gas, a moisture amount in the fuel gas, a moisture amount in the oxidizing gas, a temperature of the electrode, a temperature distribution of the electrode and an output current value; and thereby maintaining a property value calculated by a characteristic function using, as an independent variable, at least one physical quantity selected from the group consisting of the gas flow rate of the fuel gas, the gas flow rate of the oxidizing gas, the saturated steam pressure in the fuel gas, the steam pressure in the fuel gas, the saturated steam pressure in the oxidizing gas, the steam pressure in the oxidizing gas, the temperature of the electrode and the output current value at a predetermined value.

In this case, it is effective to make the outlet of the fuel gas and the oxidizing gas in the polymer electrolyte fuel cell to be substantially open to an ordinary pressure excluding an inevitable pressure loss of a heat exchanger or a total enthalpy heat exchanger provided at the rear stage of the outlet.

In addition, it is also effective that the characteristic function is represented by the formula (1):

$$Y = V^m \times (\Delta P)^n \tag{1}$$

wherein V indicates a flow rate of the fuel gas or the oxidizing gas, $\Delta P$ is the difference between a saturated steam pressure and a steam pressure in the fuel gas or the oxidizing gas and m and n are predetermined values, and that a property value Y calculated by the formula (1) is maintained to be not less than a first predetermined value and not more than a second predetermined value.

It is also effective to regulate at least one selected from the group consisting of the first predetermined value, the second predetermined value, m and n depending on an operating duration of time or output characteristics of the polymer electrolyte fuel cell.

It is also effective to make a temperature of an electrode starting point lower than a temperature of an electrode outlet point in said electrodes, the electrode starting point being a portion into which the fuel gas or the oxidizing gas is introduced and the electrode outlet point being a portion from which the fuel gas or the oxidizing gas is discharged.

It is effective to change a temperature of the electrode from the electrode starting point to the electrode outlet point against a distance from the electrode starting point to the electrode outlet point according to a curve opening downwards.

BEST MODE FOR CARRYING OUT THE INVENTION

Figure 1:
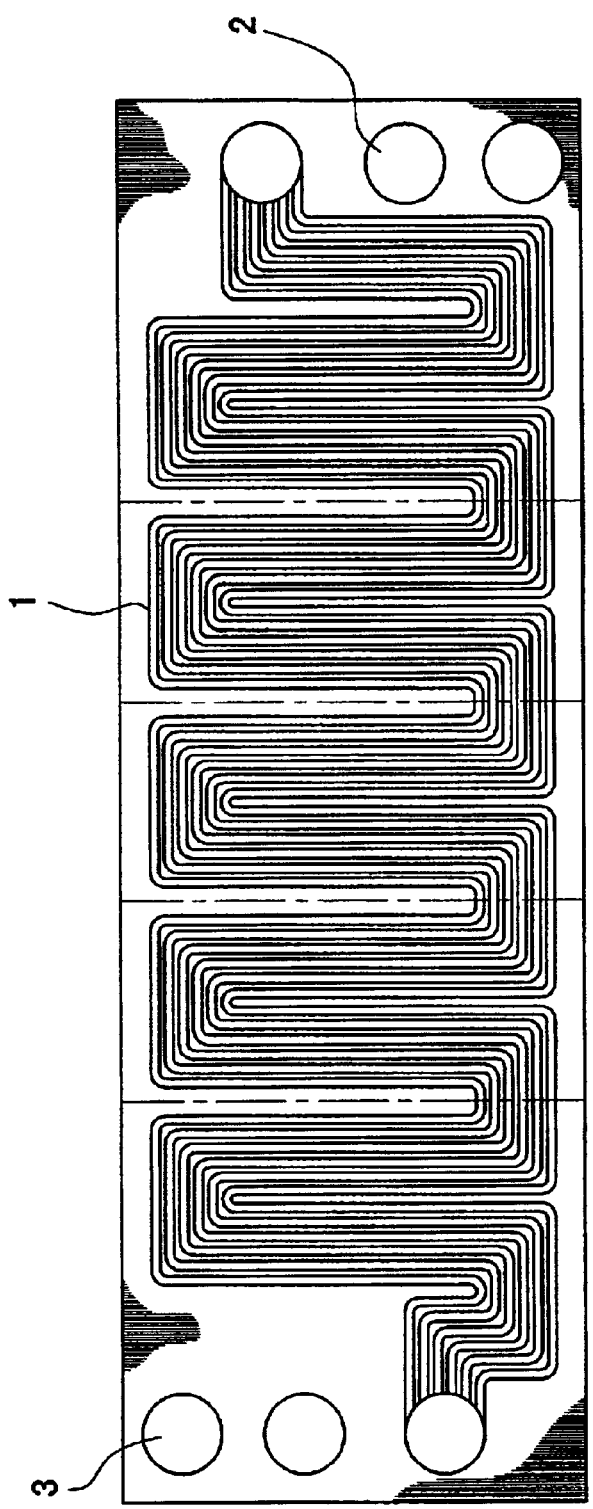
FIG. 1 is a top view showing the structure of the separator of the polymer electrolyte fuel cell according to the example of the present invention.

The embodiment of the present invention is characterized by; regulating an in-plane temperature distribution determined by a cooling water flow direction, a cooling water inlet temperature and a cooling water flow amount, a gas supply amount, a supplied moisture amount, and a current density of the polymer electrolyte fuel cell; and operating the cell in an optical condition by regulating the cell according to a function represented by a gas flow rate and the difference between a saturated steam pressure and an actual steam pressure.

In addition, the current density distribution in a single plane of the cell can be reduced by regulating; an in-plane temperature distribution determined by a cooling water flow direction, a cooling water inlet temperature and a cooling water flow amount; a gas supply amount; a supplied moisture amount; and a current density of the polymer electrolyte fuel cell, and by regulating the absolute value of the product of a gas flow rate and the difference between a saturated steam pressure and an actual steam pressure 2,000 to 70,000 kg·f/sec·m to operate the cell.

In addition, an unevenness of the current density distribution in a single plane of the cell can be reduced by regulating; an in-plane temperature distribution determined by a cooling water flow direction, a cooling water inlet temperature and a cooling water flow amount; a gas supply amount; a supplied moisture amount; and a current density of the polymer electrolyte fuel cell, and by regulating the absolute value of the product of a gas flow rate and the difference between a saturated steam pressure and an actual steam pressure in the vicinity of the gas outlet of the polymer electrolyte fuel cell 2,000 to 70,000 kg·f/sec·m to operate the cell.

In addition, in a polymer electrolyte fuel cell in; which the gas outlet is substantially open to an ordinary pressure excluding an inevitable pressure loss of the heat exchanger (including a total enthalpy heat exchanger and the like) provided at the rear stage of the gas outlet, an unevenness of the current density distribution in a single plane of the cell can be reduced by regulating; an in-plane temperature distribution determined by a cooling water flow direction, a cooling water inlet temperature and a cooling water flow amount; a gas supply amount; a supplied moisture amount; and a current density of the polymer electrolyte fuel cell, and by regulating the absolute value of the product of a gas flow rate and the difference between a saturated steam pressure and an actual steam pressure in the vicinity of the gas outlet of the polymer electrolyte fuel cell 2,000 to 70,000 kg·f/ sec·m to operate the cell.

In addition, in a polymer electrolyte fuel cell in which the gas outlet is substantially open to an ordinary pressure excluding an inevitable pressure loss of the heat exchanger or the like provided at the rear stage of the gas outlet, an unevenness of the current density distribution in a single plane of the cell can be reduced by; setting the absolute value of the product of a gas flow rate and the difference between a saturated steam pressure and an actual steam pressure in the vicinity of the gas inlet of the polymer electrolyte fuel cell be larger than the absolute value of the product of the gas flow rate and the difference between the saturated steam pressure and the actual steam pressure in the vicinity of the gas outlet by regulating a gas supply amount, a supplied moisture amount, and a current density; by so setting an in-plane temperature distribution of the polymer electrolyte fuel cell as to be higher in the vicinity of the gas outlet than in the vicinity of the gas inlet, by a cooling water flow direction and the regulations of a cooling water inlet temperature and a cooling water flow amount of the polymer electrolyte fuel cell; and by regulating the absolute value of the product of a gas flow rate and the difference between a saturated steam pressure and an actual steam pressure in the vicinity of the gas outlet be 2,000 to 70,000 kg·f/sec·m to operate the cell.

In addition, an unevenness of the current density distribution in a single plane of the cell can be reduced by; making the absolute value of the product of a gas flow rate and the difference between a saturated steam pressure and an actual steam pressure in the vicinity of the gas inlet of the polymer electrolyte fuel cell be larger than the absolute value of the product of the gas flow rate and the difference between the saturated steam pressure and the actual steam pressure in the vicinity of the gas outlet by regulating a gas supply amount to the polymer electrolyte fuel cell, a supplied moisture amount, and a current density; making an in-plane temperature distribution of the polymer electrolyte fuel cell form a curve opening downwards rather than a linear distribution by regulating a cooling water flow direction, a cooling water inlet temperature, and a cooling water flow amount of the polymer electrolyte fuel cell; and regulating the absolute value of the product of a gas flow rate and the difference between a saturated steam pressure and an actual steam pressure in the vicinity of the gas outlet be 2,000 to 70,000 kg·f/sec·m to operate the cell.

To be more preferably, an unevenness of the current density distribution in a single plane of the cell can be reduced by regulating; an in-plane temperature distribution determined by a cooling water flow direction, a cooling water inlet temperature and a cooling water flow amount; an oxidizing gas supply amount; a moisture amount supplied to the oxidizing gas; and a current density in the polymer electrolyte fuel cell to operate the cell.

To be more preferably, an unevenness of the current density distribution in a single plane of the cell can be reduced by making the pressure loss at the inlet of the gas supplied to the polymer electrolyte fuel cell be 0.5 kg·f/cm$^2$ or less.

To be more preferably, an unevenness of the current density distribution in a single plane of the cell can be reduced by; regulating an in-plane temperature distribution determined by a cooling water flow direction, a cooling water inlet temperature and a cooling water flow amount, a gas supply amount, a supply moisture amount, and a current density in the polymer electrolyte fuel cell; and making the absolute value of the product of a gas flow rate and the difference between a saturated steam pressure and an actual steam pressure 2,000 to 30,000 kg·f/sec·m when the current density is smaller than 0.5 A/cm$^2$, and making the absolute value of the product of the gas flow rate and the difference between the saturated steam pressure and the actual steam pressure be 8,000 to 40,000 kg·f/sec·m when the current density is larger than 0.5 A/cm$^2$ to operate the cell.

To be more preferably, an unevenness of the current density distribution in a single plane of the cell can be reduced by regulating; an in-plane temperature distribution determined by a cooling water flow direction, a cooling water inlet temperature and a cooling water flow amount; a gas supply amount; a supply moisture amount; and a current density of the polymer electrolyte fuel cell, and by regulating a distribution of the absolute value of the product of a gas flow rate and the difference between a saturated steam pressure and an actual steam pressure in the whole gas flow plane be 10,000 kg·f/sec·m or less to operate the cell.

To be more preferably, when the performance of the polymer electrolyte fuel cell is deteriorated with the elapse of time, an unevenness of the current density distribution in a single plane of the cell can be reduced by regulating; an in-plane temperature distribution determined by a cooling water flow direction, a cooling water inlet temperature and a cooling water flow amount; a gas supply amount; a supply moisture amount; and a current density, and regulating the absolute value of the product of a gas flow rate and the difference between a saturated steam pressure and an actual steam pressure be 20,000 kg·f/sec·m or more to operate the cell.

To be more preferably, an unevenness of the current density distribution in a single plane of the cell can be reduced by; making the direction of the gas inlet side or the gas outlet side of the polymer electrolyte fuel cell, which has a larger absolute value of the product of a gas flow rate and the difference between a saturated steam pressure and an actual steam pressure, the same as that of a cooling water inlet side; and by making the direction of the gas inlet side or the gas outlet side, which has a smaller absolute value of the product of the gas flow rate and the difference between the saturated steam pressure and the actual steam pressure, the same as that of the cooling water outlet side.

In the followings, preferable examples of the present invention will be described by referring to the drawings.

EXAMPLE 1

In order to observe a current density distribution (performance distribution) in a single plane of a polymer electrolyte fuel cell, a stacked cell composed of 20 unit cells was fabricated on the assumption that the cell was divided into five portions in a single plane thereof using a separator divided into five as shown in FIG. 1 to measure performances of the portions individually.

The fabrication of MBAs was carried out as follows. Carbon powder whose particle diameter was several microns or smaller was immersed in an aqueous solution of chloroplatinic acid, and a platinum catalyst was carried on the surface of the carbon powder by a reduction treatment. Here, the weight ratio of the carbon and platinum carried thereon was 1:1. Then, the carbon powder with platinum carried thereon was dispersed into an alcohol solution of a polymer electrolyte to obtain a slurry.

On the other hand, a carbon paper having a thickness of 250 $\mu$m, which was to be an electrode, was impregnated with an aqueous dispersion of fluorocarbon resin (Neoflon ND1 manufactured by Daikin Industries, Ltd.), dried, and subjected to a heat treatment at 400° C. for 30 minutes so as to make the carbon paper water-repellent. Then, the slurry containing the carbon powder was evenly applied on one side of the carbon paper subjected to the water repelling treatment to form a catalytic reaction layer, thereby making an electrode.

Two carbon paper electrodes produced in the above manner were laminated with a polymer electrolyte membrane disposed therebetween in such a manner that the sides having the catalytic reaction layers faced inside, and then dried.

The dimensions of the carbon paper electrodes were set at 3.6 cm in length and 9 cm at width, and five carbon paper electrodes were disposed at predetermined intervals on the center of the polymer electrolyte membrane having sufficient length and width so as to produce an electrode apparently divided into five in a single plane. In order to prevent a supplied fuel gas and air from leaking or being mixed each other, silicone rubber sheets having a thickness of 250 $\mu$m were provided around the electrodes with the polymer electrolyte membrane disposed between the sheets, and hot-pressed at 120° C. for 5 minutes so as to obtain an MEA (Membrane Electrolyte Assembly).

The separator was 4 mm in thickness, and a gas channel 1 having a width of 2 mm and a depth of 1 mm was formed on the surface thereof by a cutting process. Then, as shown in FIG. 1, a gas manifold aperture 2 and a cooling water manifold aperture 3 were provided on the periphery of the separator. After two such unit cells were stacked, a cooling unit composed of a separator having cooling channels for the cooling water flowing was stacked, and this pattern was stacked repeatedly. The O-ring for sealing the cooling unit was not used.

Twenty such unit cells were stacked; a metallic electric collecting plate and an insulating plate made of an electric insulating material were arranged at both ends: and a fastening rod was used to fix between one end plate and the other end plate so as to obtain a fuel cell module. The fastening pressure per area of the separator in this case was set at 10 kgf/cm².

[Evaluations]

To the module thus obtained, pure hydrogen was supplied as a fuel gas through a deionized water bubbler maintained at 75° C., and air was supplied as an oxidizing gas through a deionized water bubbler maintained at a predetermined temperature so as to conduct an electric power generation test with a cooling water flowing. At this time, the fuel gas, the oxidizing gas and the cooling water were introduced in the same direction, and the gas outlet was open to an ordinary pressure.

In first, the cell operating temperature was set at 75° C., then a comparatively large amount of cooling water of 20 L/min set at 75° C. was flown in order to suppress a temperature distribution as much as possible, and a performance distribution in the plane of the cell was examined under the condition of Uf (a consumption rate of hydrogen in the fuel gas)=80%, and Uo (a consumption rate of oxygen in the oxidizing gas)=20%.

Figure 2:
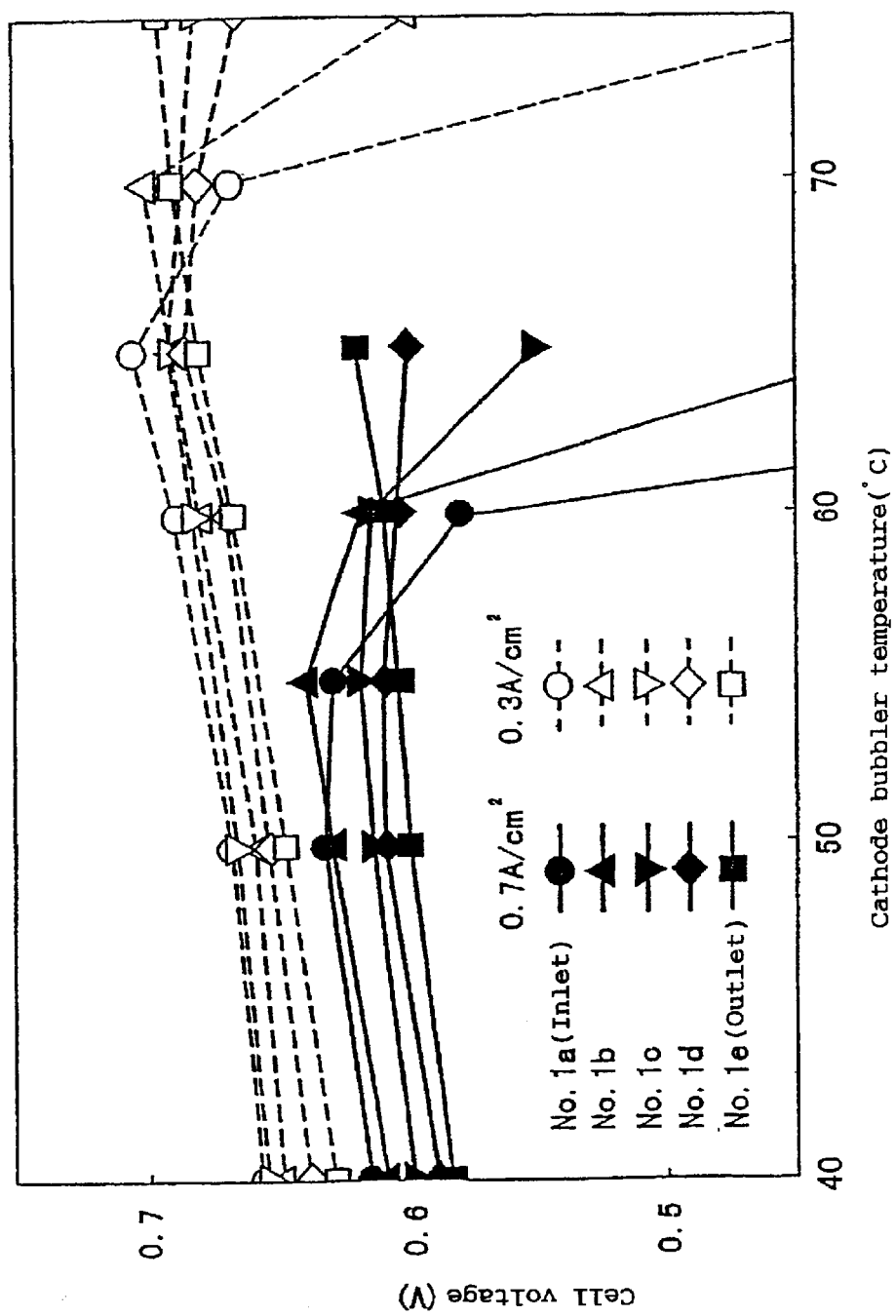
FIG. 2 is a graph showing the characteristics of the polymer electrolyte fuel cell according to Example 1 of the present invention.

Shown in FIG. 2 was average voltage characteristics, which depends on an oxidizing gas bubbler temperature, of 20 unit cells in the partial modules obtained by apparently dividing the above-mentioned module into five in the case where the module was operated at constant current densities of 0.3 A/cm² and 0.7 A/cm². In the 5 apparently divided module, the partial module closest to the gas inlet was referred to as No.1a followed by No.1b, No.1c, and No.1d, and the one closest to the gas outlet was referred to as No.1e.

FIG. 2 indicates that at a current density of 0.3 A/cm², when the oxidizing gas bubbler temperature is relatively low, the closer the portion is to the gas inlet, the higher the characteristics thereof become. However, when the bubbler temperature was raised, the performance dropped suddenly from the partial module No.1a closest to the gas inlet. It was found out from a measurement of the internal resistance at this time that the module No.1a was in the over flooding state. In addition, the pressure loss at the gas inlet was 0.2 kg·f/cm² when the oxidizing gas bubbler temperature was 70° C. The relation between the bubbler temperature and the product (V·ΔP) of a gas flow rate (V)(m=1) and the difference (ΔP)(n−1) between a saturated steam pressure and an actual steam pressure in the vicinity of the gas inlet and in the vicinity of the gas outlet was shown in Table 1.

Here, in the case of an actual steam pressure is larger than a saturated steam pressure, ΔP becomes negative, so V·ΔP also becomes negative. However, it is hard to regard that the actual steam pressure becomes extremely larger than the saturated steam pressure, so it is enough to evaluate the absolute value of V·ΔP. Therefore, in the followings, the absolute value was shown.

TABLE 1

| Bubbler temperature (° C.) | | 40 | 50 | 60 | 65 | 70 | 75 |
|---|---|---|---|---|---|---|---|
| Y = V · ΔP (kgf/sm) | Gas inlet | 39,000 | 29,000 | 17,000 | 11,000 | 200 | 0 |
| | Gas outlet | 33,000 | 25,000 | 13,000 | 9,000 | 2,500 | 0 |

When V·ΔP (=Y) was smaller than about 2,000, there was an over flooding state; when V·ΔP was larger than about 30,000, there was an over dry state; and V·ΔP in the optimum operating condition was around 2,000 to 30,000.

Then, at a current density of 0.7 A/cm², when the oxidizing gas bubbler temperature was relatively low, the closer the portion was to the gas inlet, the higher the characteristics thereof became. However, when the bubbler temperature was raised, the performance of the partial module No.1a closest to the gas inlet dropped suddenly. It was found out from a measurement of the internal resistance at this time that the partial module No.1a was in the over flooding state. In addition, the pressure loss at the gas inlet was 0.4 kg·f/cm² when the oxidizing gas bubbler temperature was 70° C. The relation between the bubbler temperature and the absolute values (V·ΔP) of the product of a gas flow rate (V) and the difference (ΔP) between a saturated steam pressure and an actual steam pressure in the vicinity of the gas inlet and in the vicinity of the gas outlet was shown in Table 2.

TABLE 2

| Bubbler temperature (° C.) | | 30 | 40 | 50 | 55 | 60 | 65 |
|---|---|---|---|---|---|---|---|
| V · ΔP (kgf/sm) | Gas inlet | 70,000 | 63,000 | 49,000 | 39,000 | 24,000 | 1,800 |
| | Gas outlet | 58,000 | 53,000 | 45,000 | 39,000 | 31,000 | 20,000 |

When V·ΔP was smaller than about 2,000, there was an over flooding state; when V·ΔP was larger than about 70,000, there was a somewhat over dry state; and V·ΔP in the optimum operating condition was around 2,000 to 70,000. Under the above condition, it was possible to suppress a performance distribution in a single plane of the cell. Under the condition that V·ΔP was outside the range of 2,000 to 70,000, there was an extreme performance decrease observed in a part of the stacked cell constituent units.

EXAMPLE 2

A fuel cell module was produced in the same manner as in Example 1, and an electric power generation test was performed by supplying pure hydrogen as a fuel gas through a deionized water bubbler maintained at 75° C., and supplying air as an oxidizing gas through a deionized water bubbler maintained at a predetermined temperature with a cooling water flowing.

At this time, the fuel gas, the oxidizing gas and the cooling water were introduced in the same direction, and the gas outlet was open to an ordinary pressure. The cooling water amount set at 75° C. was flown at 2 L/min, and a performance distribution in a plane of the cell was examined under the condition of Uf (a consumption rate of hydrogen in the fuel gas)=80%, and Uo (a consumption rate of oxygen in the oxidizing gas)=20%.

Figure 3:
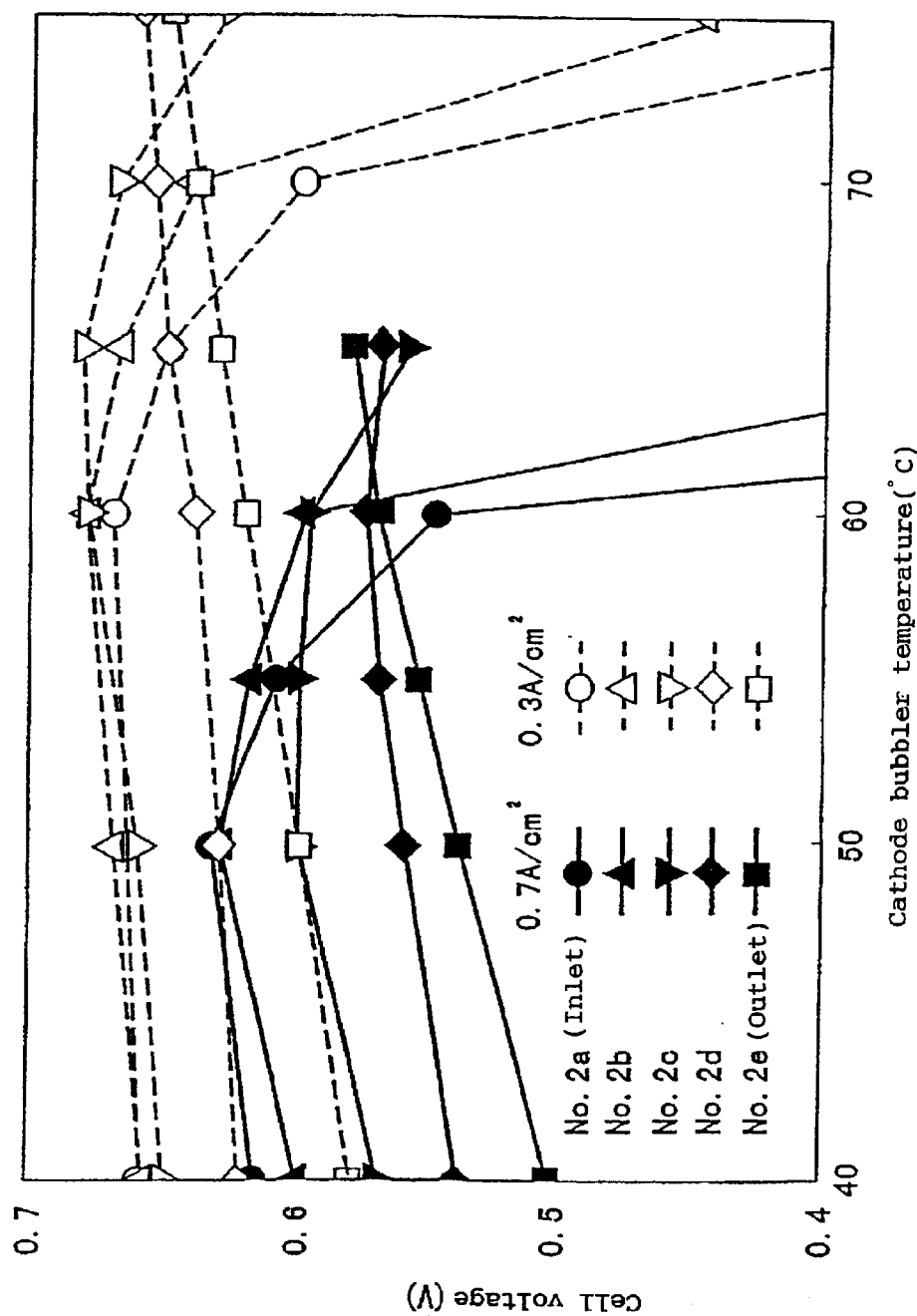
FIG. 3 is a graph showing the characteristics of the polymer electrolyte fuel cell according to Example 2 of the present invention.

Shown in FIG. 3 was average voltage characteristics, which depends on an oxidizing gas bubbler temperature, of 20 unit cells in the partial modules obtained by apparently dividing the above-mentioned module into five in the case where the module was operated at constant current densities of 0.3 A/cm² and 0.7 A/cm². In the 5 apparently divided module, the partial module closest to the gas inlet was referred to as No.2a followed by No.2b, No.2c, and No.2d, and the one closest to the gas outlet was referred to as No.2e.

In this case, since the cooling water flow amount was made comparatively small, there was a temperature distribution from the partial module No.2a to No.2e. In the case where the current density was 0.3 A/cm², the average temperatures of the unit cells in the partial modules was 74.9° C. at No.2a, 75.6° C. at No.2b, 76.5° C. at No.2c, 77.5° C. at No.2d, and 78.0° C. at No.2e respectively, indicating that the temperature of the portion closer to the upstream parts of the gas flow became lower and the temperature of the portion closer to the downstream parts of the gas flow became higher. On the other hand, when the current density was 0.7 A/cm², the average temperature of the unit cells in the partial modules was 75.2° C. at No.2a, 77.1° C. at No.2b, 79.5° C. at No.2c, 81.9° C. at No.2d, and 83.1° C. at No.2e respectively, also indicating that the temperature of the portion closer to the upstream parts of the gas flow became lower and the temperature of the portion closer to the downstream parts of the gas flow became higher.

As shown in FIG. 3, both in the case of a current density of 0.3 A/cm² and in the case of a current density of 0.7 A/cm², the temperatures were relatively lower in the partial modules No.2a and No.2b closer to the gas inlet than in the other partial modules and, therefore, a performance decrease due to a considerable over flooding phenomenon was observed. On the other hand, the temperatures were relatively high in the partial modules No.2d and No.2e closer to the gas outlet and, therefore, a performance decrease due to a considerable over dry phenomenon was observed.

In general, on the air electrode side, there is an occurrence of generated water, so the steam partial pressure increases at the portion closer to the gas outlet. Therefore, as disclosed in Japanese Unexamined Patent Publication No. Hei 9-511356, it has been tried to suppress the over flooding in the downstream parts of the air electrode to reduce the current density distribution in a single plane of the cell, by making an oxidizing gas flow direction and a cooling water flow direction the same, and by setting the temperature in the downstream parts of the oxidizing gas higher than in the upstream parts by means of a temperature distribution of the cooling water. However, in the present example, since the operation was done with relatively low Uo of 20%, the pressure loss at the gas inlet w when the oxidizing gas bubbler temperature was 70° C. as high as 0.4 kg·f/cm², and the increase in the relative humidity at the gas inlet due to the pressure loss at the gas inlet was more influential than the effect of an increase in the steam partial pressure at the gas outlet due to the occurrence of generated water. Therefore, the gas inlet side was inherently in the over flooding state, and the gas outlet side was rather in the over dry state. In contrast, the temperature distribution resulted in a relative increase in the temperature of the gas outlet side, which caused the reverse effect of increasing the over dry on the gas outlet side and increasing the over flooding on the gas inlet side.

The relation between the bubbler temperature and the absolute values (V·ΔP) of the product of a gas flow rate (V) and the difference (ΔP) between a saturated steam pressure and an actual steam pressure in the vicinity of the gas inlet and in the vicinity of the gas outlet at a current density of 0.3 A/cm² is shown in Table 3 (In the formula (1), m=1, n=1).

TABLE 3

| Bubbler temperature (° C.) | | 40 | 50 | 60 | 65 | 70 | 75 |
|---|---|---|---|---|---|---|---|
| V · ΔP (kgf/sm) | Gas inlet | 35,000 | 20,000 | 15,000 | 9,000 | 100 | 0 |
| | Gas outlet | 55,000 | 43,000 | 32,000 | 27,000 | 5,500 | 2,000 |

The relation between the bubbler temperature and the absolute values (V·ΔP) of the product of a gas flow rate (V) and the difference (ΔP) between a saturated steam pressure and an actual steam pressure in the vicinity of the gas inlet and in the vicinity of the gas outlet at a current density of 0.7 A/cm² is shown in Table 4.

TABLE 4

| Bubbler temperature (° C.) | | 30 | 40 | 50 | 55 | 60 | 65 |
|---|---|---|---|---|---|---|---|
| V · ΔP (kgf/sm) | Gas inlet | 60,000 | 53,000 | 48,000 | 36,000 | 21,000 | 1,000 |
| | Gas outlet | 88,000 | 73,000 | 65,000 | 49,000 | 41,000 | 30,000 |

When V·ΔP was outside the range of 2,000 to 70,000, there was a part in a single plane of the cell where the over flooding and the over dry coexisted, and an extreme performance decrease was observed in the stacked 20 cell constituent units, making it difficult to operate the stacked cell in a stable manner.

EXAMPLE 3

An electric power generation test was performed with a fuel cell module produced in the same manner as in Example 1 by supplying pure hydrogen as a fuel gas through a deionized water bubbler maintained at 75° C., and supplying air as an oxidizing gas through a deionized water bubbler maintained at a predetermined temperature with a cooling water flowing.

At this time, the fuel gas and the oxidizing gas were introduced in the same direction, and the gas outlet was open to an ordinary pressure. The cooling water was introduced in the direction opposite to the gas flow direction. The cooling water amount set at 75° C. was flown at 2 L/min, and a performance distribution in a plane of the cell was examined under the condition that Uf (a consumption rate of hydrogen in the fuel gas)=80%, and Uo (a consumption rate of oxygen in the oxidizing gas)=20%.

Figure 4:
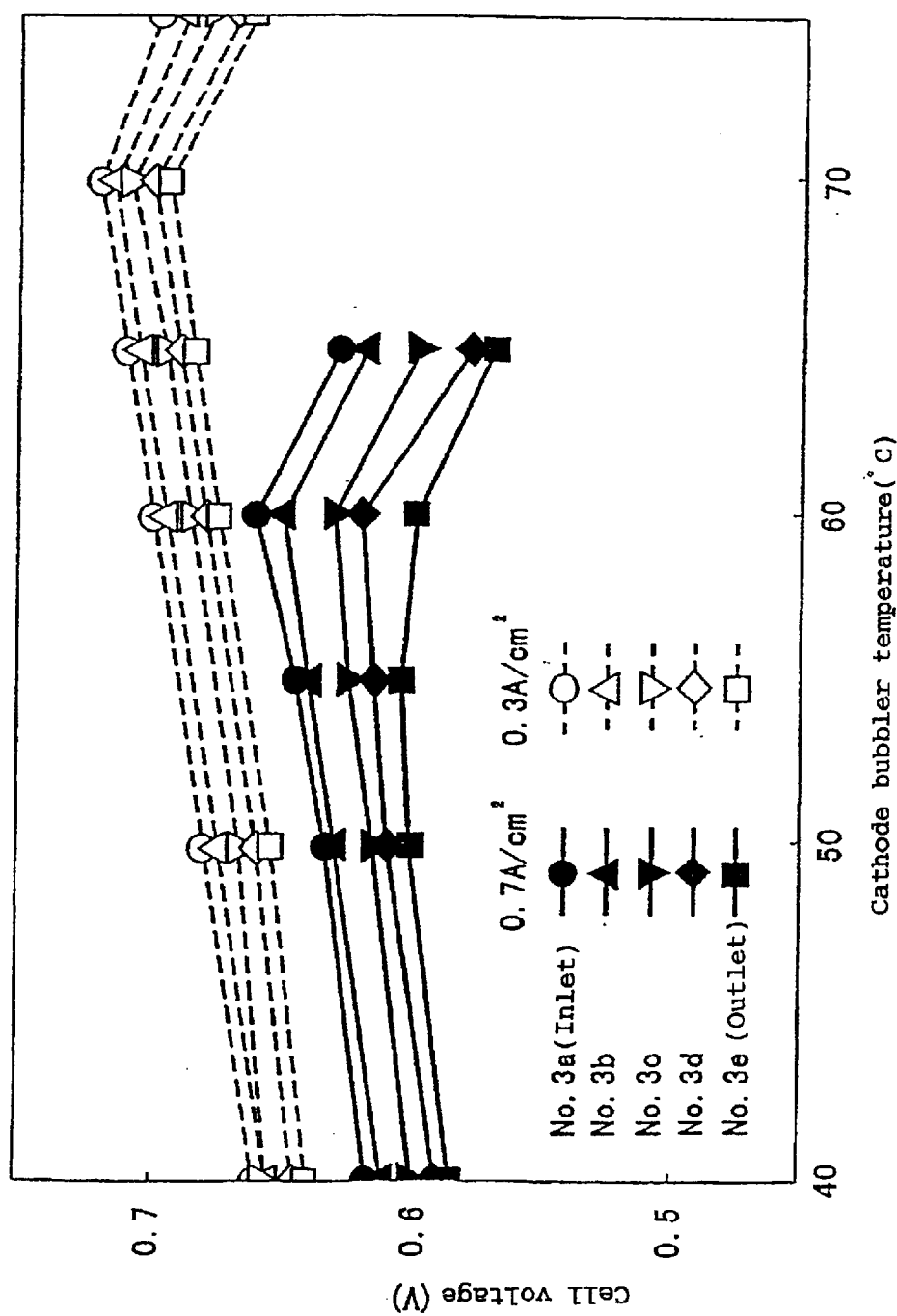
FIG. 4 is a graph showing the characteristics of the polymer electrolyte fuel cell according to Example 3 of the present invention.

Shown in FIG. 4 was average voltage characteristics, which depend on an oxidizing gas bubbler temperature, of 20 unit cells in the partial modules obtained by apparently dividing the above-mentioned module into five in the case where the module was operated at a constant current density of 0.7 A/cm². In the 5 apparently divided modules, the partial module closest to the gas inlet was referred to as No.3a, followed by No.3b, No.3c, and No.3d, and the one closest to the gas outlet was referred to as No.3e.

In this case, since the cooling water flow amount was made comparatively small, there was a temperature distribution from the partial module No.3a to No.3e. When the current density was 0.3 A/cm², the average temperatures of the 20 cell constituent units in the partial modules was 78.2° C. at No.3a, 77.6° C. at No.3b, 76.7° C. at No.3c, 75.9° C. at No.3d, and 75.0° C. at No.3e respectively, indicating that the temperature at the portion closer to the upstream parts of the gas flow became higher and the temperature at the portion closer to the downstream parts of the gas flow became lower. In the case of 0.7 A/cm², the average temperatures of the 20 cell constituent units in the partial modules were 83.2° C. at No.3a, 82.1° C. at No.3b, 79.8° C. at No.3c, 76.9° C. at No.3d, and 75.1° C. at No.3e respectively, also indicating that the temperature at the portion closer to the upstream parts of the gas flow and became higher the temperature at the portion closer to the downstream parts of the gas flow became lower. At this time, the temperature distribution from No.3a to No.3e was not linear one but one in the form of a curve opening downwards.

As shown in FIG. 4, both in the case of a current density of 0.3 A/cm² and in the case of a current density of 0.7 A/cm², the characteristics of the partial module closer to the gas inlet was higher. However, the bubbler temperature dependence showed similar tendencies in any partial module, and the characteristics was extremely stable in all partial modules.

In general, on the air electrode side, there is an occurrence of generated water, so the steam partial pressure increases at the portion closer to the gas outlet. However, in the present example, since the operation was done with a relatively low Uo of 20%, the pressure loss at the gas inlet when the oxidizing gas bubbler temperature was 70° C. as relatively high as 0.4 kg·f/cm², and an increase in the relative humidity at the gas inlet due to the pressure loss at the gas inlet was more influential than the effect of an increase in the steam partial pressure at the gas outlet due to the occurrence of generated water. Therefore, the gas inlet side was inherently in the over flooding state, and the gas outlet side was rather in the over dry state. In contrast, since the temperature distribution resulted in a relative increase in the temperature on the gas outlet side, there was the effect of suppressing the over flooding on the gas inlet side and suppressing the over dry on the gas outlet side, thereby obtaining stable cell characteristics.

The relation between bubbler temperature and the absolute values (V·ΔP) of the product of a gas flow rate (V) and the difference (ΔP) between a saturated steam pressure and an actual steam pressure in the vicinity of the gas inlet and in the vicinity of the gas outlet at a current density of 0.3 A/cm² is shown in Table 5.

TABLE 5

| Bubbler temperature (° C.) | | 40 | 50 | 60 | 65 | 70 | 75 |
|---|---|---|---|---|---|---|---|
| V · ΔP (kgf/sm) | Gas inlet | 25,000 | 15,000 | 10,000 | 7,000 | 5,000 | 2,000 |
| | Gas outlet | 28,000 | 18,000 | 12,000 | 8,000 | 5,500 | 2,200 |

The relation between the bubbler temperature and the absolute values (V·ΔP) of the product of a gas flow rate (V) and the difference (ΔP) between a saturated steam pressure and an actual steam pressure in the vicinity of the gas inlet and in the vicinity of the gas outlet at a current density of 0.7 A/cm² is shown in Table 6.

TABLE 6

| Bubbler temperature (° C.) | | 30 | 40 | 50 | 55 | 60 | 65 |
|---|---|---|---|---|---|---|---|
| V · ΔP (kgf/sm) | Gas inlet | 35,000 | 23,000 | 18,000 | 16,000 | 11,000 | 8,000 |
| | Gas outlet | 38,000 | 24,000 | 19,000 | 17,000 | 12,000 | 9,000 |

From above, when the current density was 0.3 A/cm², the optimum range of the absolute value (V·ΔP) of the product of the gas flow rate (V) and the difference (ΔP) between the saturated steam pressure and the actual steam pressure according to the bubbler temperature in the vicinity of the gas inlet and in the vicinity of the gas outlet was 2,000 to 30,000 kg·f/s·m, and when the current density was 0.7 A/cm², the optimum range of the absolute value (V·ΔP) of the product of the gas flow rate (V) and the difference (ΔP) between the saturated steam pressure and the actual steam pressure according to the bubbler temperature in the vicinity of the gas inlet and in the vicinity of the gas outlet was 8,000 to 40,000 kg·f/s·m. Under the condition, a performance distribution in a single plane of the cell could be minimized.

EXAMPLE 4

An electric power generation test was performed with a fuel cell module produced in the same manner as in Example 1 by supplying pure hydrogen as a fuel gas through a deionized water bubbler maintained at 75° C., and supplying air as an oxidizing gas through a deionized water bubbler maintained at a predetermined temperature with a cooling water flowing.

At this time, the fuel gas, the oxidizing gas, and the cooling water were introduced in the same direction, and the gas outlet was open to an ordinary pressure. In first, the cell operating temperature was set at 75° C., then a comparatively large amount of cooling water of 20 L/min set at 75° C. was flown in order to suppress a temperature distribution as much as possible, and a performance distribution in the plane of the cell was examined under the condition of Uf (a consumption rate of hydrogen in the fuel gas)=80%, and Uo (a consumption rate of oxygen in the oxidizing gas)=40%.

Figure 5:
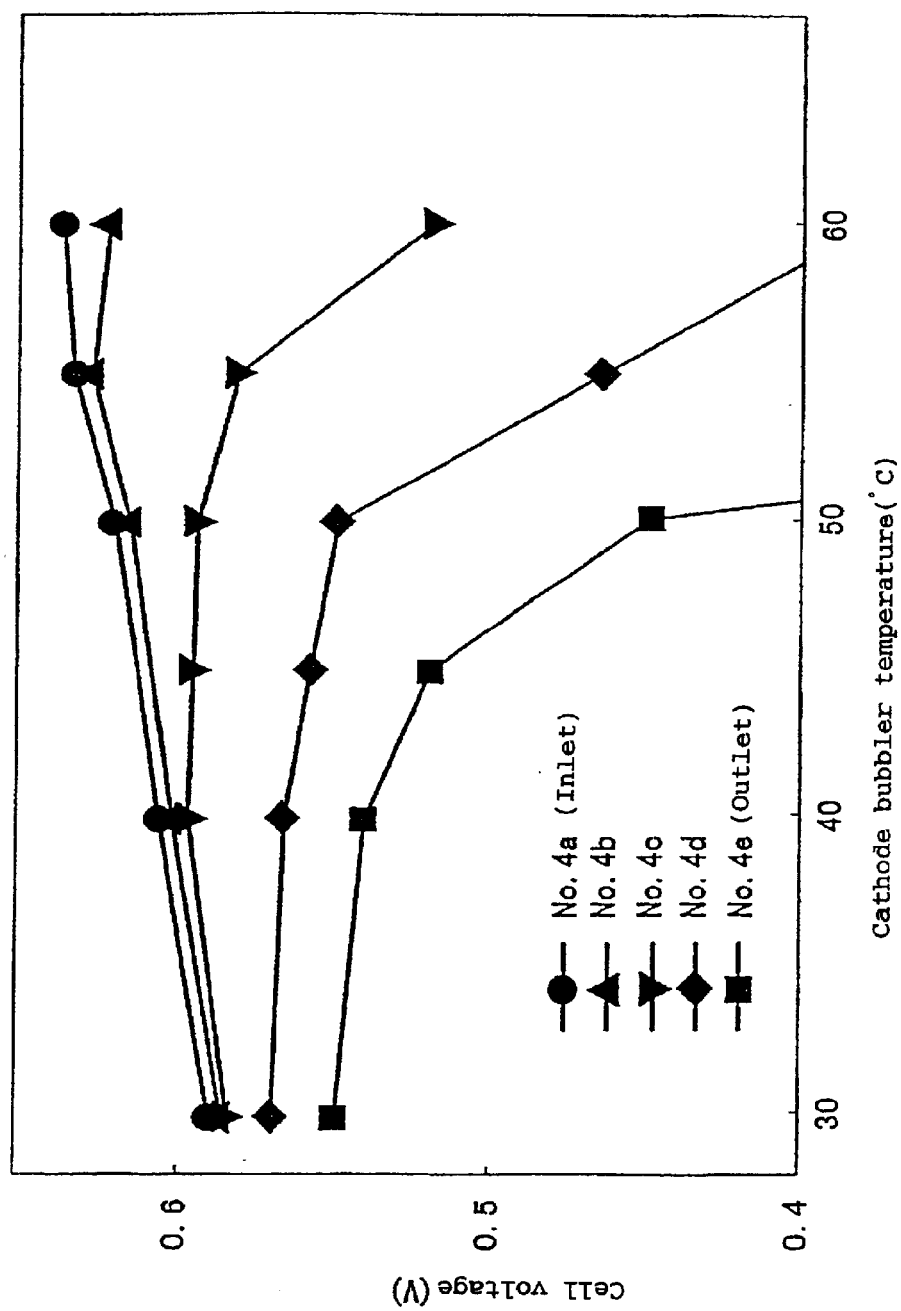
FIG. 5 is a graph showing the characteristics of the polymer electrolyte fuel cell according to Example 4 of the present invention.

Shown in FIG. 5 was average voltage characteristics, which depend on an oxidizing gas bubbler temperature, of 20 unit cells in the partial modules obtained by apparently dividing the above-mentioned module into five in the case where the module was operated at a constant current density of 0.7 A/cm². In the 5 apparently divided modules, the partial module closest to the gas inlet is referred to as No.4a, followed by No.4b, No.4c, and No.4d, and the one closest to the gas outlet is referred to as No.4e.

FIG. 5 indicates that at a current density of 0.7 A/cm², the characteristics of the partial module closer to the gas inlet became higher. However, when the bubbler temperature was raised, the performance dropped suddenly from the partial module No.4e closest to the gas outlet. It was found out from a measurement of the internal resistance at this time that the module No.4e was in the over flooding state. In addition, when the oxidizing gas bubbler temperature was 60° C., the pressure loss at the gas inlet was 0.2 kg·f/cm². The relation between the bubbler temperature and the absolute values (V·ΔP) of the product of a gas flow rate (V) and the difference (ΔP) between a saturated steam pressure and an actual steam pressure in the vicinity of the gas inlet and the gas outlet and is shown in Table 7.

TABLE 7

| Bubbler temperature (° C.) | | 30 | 40 | 50 | 55 | 60 |
|---|---|---|---|---|---|---|
| V · ΔP (kgf/sm) | Gas inlet | 35,000 | 32,000 | 27,000 | 22,000 | 17,000 |
| | Gas outlet | 18,000 | 14,000 | 11,000 | 7,000 | 5,000 |

When V·ΔP was smaller than about 7,000, there was observed an over flooding state; when V·ΔP was larger than about 32,000, there was observed a somewhat over dry state; and V·ΔP in the optimum operating condition was around 8,000 to 40,000. Under the condition, a performance distribution in a single plane of the cell could be minimized. The difference in V·ΔP between the gas inlet and the gas outlet was 12,000 or over, making a stable operation impossible. When V·ΔP was outside the range of 8,000 to 40,000, there was a cell constituent unit suffering from an extreme performance decrease out of the stacked 20 cell constituent units in the partial modules.

EXAMPLE 5

An electric power generation test was performed with a fuel cell module produced in the same manner as in Example 1 by supplying pure hydrogen as a fuel gas through a deionized water bubbler maintained at 75° C., and supplying air as an oxidizing gas through a deionized water bubbler maintained at a predetermined temperature with a cooling water flowing.

At this time, the fuel gas, the oxidizing gas and the cooling water were introduced in the same direction, and the gas outlet was open to an ordinary pressure. The cooling water set at 75° C. was flown at 2 L/min, and a performance distribution in a plane of the cell was examined under the condition of Uf (a consumption rate of hydrogen in the fuel gas)=80%, and Uo (a consumption rate of oxygen in the oxidizing gas)=40%.

Figure 6:
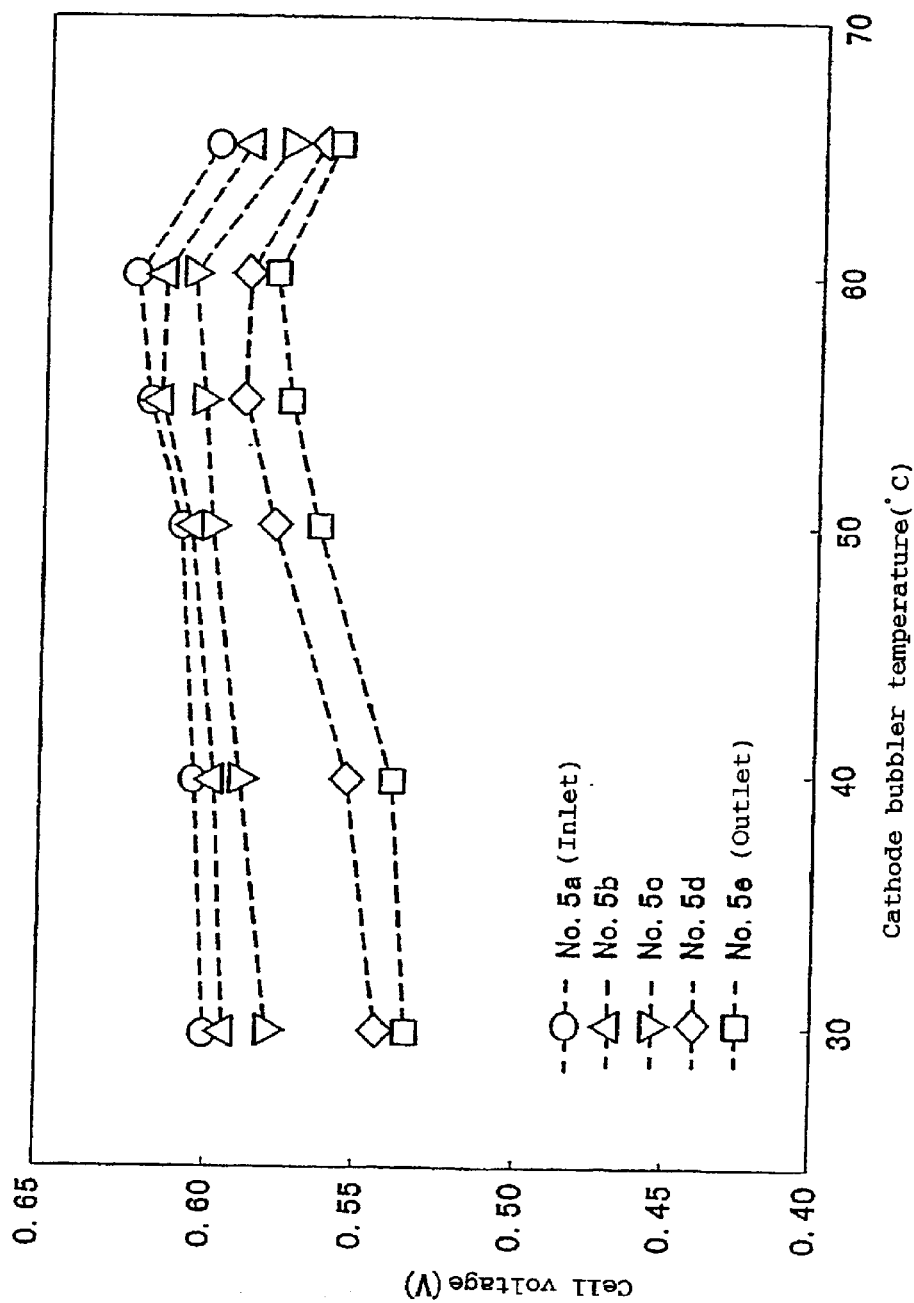
FIG. 6 is a graph showing the characteristics of the polymer electrolyte fuel cell according to Example 5 of the present invention.

Shown in FIG. 6 was average voltage characteristics, which depend on an oxidizing gas bubbler temperature, of 20 unit cells in the partial modules obtained by apparently dividing the above-mentioned module into five in the case where the module was operated at a constant current density of 0.7 A/cm$^2$. In the 5 apparently divided modules, the partial module closest to the gas inlet was referred to as No.5a followed by No.5b, No.5c, and No.5d, and the one closest to the gas outlet was referred to as No.5e. In this case, since the cooling water flow amount was made comparatively small, there was a temperature distribution from the partial module No.5a to No.5e. When the current density was 0.7 A/cm$^2$, the average cell temperatures of the 20 cell constituent units in the partial modules were 75.1° C. at No.5a, 77.0° C. at No.5b, 79.7° C. at No.5c, 81.8° C. at No.5d, and 83.0° C. at No.5e respectively, indicating that the temperature became lower at the portion closer to the upstream parts of the gas flow and the temperature became higher at the portion closer to the downstream parts of the gas flow. At this time, the temperature distribution from No.5a to No.5e was not linear one but one in the form of a curve opening downwards.

As shown in FIG. 6, when the current density was 0.7 A/cm$^2$, the characteristics of the partial module closer to the gas inlet were higher. However, the bubbler temperature dependence showed similar tendencies in any partial module, and the characteristics were extremely stable in all partial modules.

In general, on the air electrode side, there is an occurrence of generated water, so the steam partial pressure increases at the portion closer to the gas outlet. On the other hand, the gas inlet has a higher pressure than the gas outlet due to the pressure loss at the gas inlet, which causes an increase in the relative humidity at the gas inlet. However, in the present example, the pressure loss at the gas inlet when the oxidizing gas bubbler temperature was 70° C. was as relatively low as 0.2 kg·f/cm$^2$, and an effect of an increase in the steam partial pressure at the gas outlet due to the occurrence of generated water was more influential than an increase in the relative humidity at the gas inlet due to the pressure loss at the gas inlet. Therefore, the gas outlet side was inherently in the over flooding state, and the gas inlet side was in the over dry state. In contrast, the temperature distribution resulted in a relative increase in the temperature on the gas outlet side, which had the effect of suppressing the over flooding on the gas outlet side and suppressing the over dry on the gas inlet side, thereby giving stable cell characteristics.

The relation between a bubbler temperature in the vicinity of the gas inlet and the absolute values (V·ΔP) of the product of a gas flow rate (V) and the difference (ΔP) between a saturated steam pressure and an actual steam pressure in the vicinity of the gas outlet at a current density of 0.7 A/cm$^2$ is shown in Table 8.

TABLE 8

| Bubbler temperature (° C.) | | 30 | 40 | 50 | 55 | 60 | 65 |
|---|---|---|---|---|---|---|---|
| V·ΔP (kgf/sm) | Gas inlet | 36,000 | 33,000 | 27,000 | 23,000 | 18,000 | 10,000 |
| | Gas outlet | 38,000 | 36,000 | 33,000 | 28,000 | 25,000 | 20,000 |

From above, when the current density was 0.7 A/cm$^2$, the optimum range of the absolute value (V·ΔP) of the product of the gas flow rate (V) and the difference (ΔP) between the saturated steam pressure and the actual steam pressure according to the bubbler temperature in the vicinity of the gas inlet and in the vicinity of the gas outlet and was 10,000 to 38,000 kg·f/s·m. Under the condition, a performance distribution in a single plane of the cell could be minimized.

EXAMPLE 6

An electric power generation test was performed with a fuel cell module produced in the same manner as in Example 1 by supplying pure hydrogen as a fuel gas through a deionized water bubbler maintained at 75° C. and supplying air as an oxidizing gas through a deionized water bubbler maintained at a predetermined temperature with a cooling water flowing.

At this time, the fuel gas, the oxidizing gas, and the cooling water were introduced in the same direction, and the gas outlet was narrowed to make the pressure of the gas outlet be 2.0 kg·f/cm$^2$ on the basis of the gauge pressure. The cooling water set at 75° C. was flown at 2 L/min, and a performance distribution in a plane of the cell was examined under the condition of Uf (a consumption rate of hydrogen in the fuel gas)=80%, and Uo (a consumption rate of oxygen in the oxidizing gas)=50%.

Figure 7:
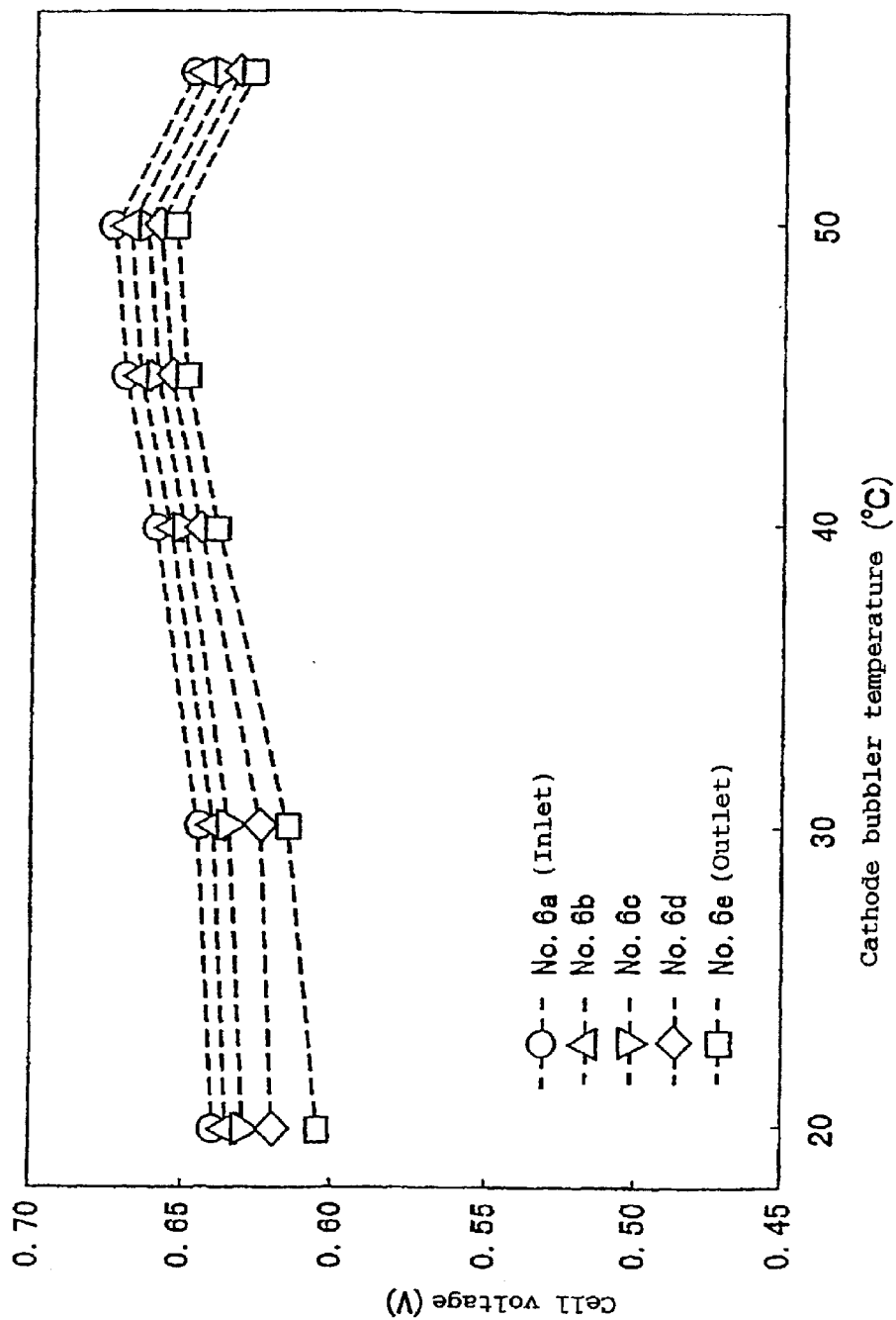
FIG. 7 is a graph showing the characteristics of the polymer electrolyte fuel cell according to Example 6 of the present invention.

Shown in FIG. 7 was the average voltage characteristics, which depend on an oxidizing gas bubbler temperature dependence, of 20 cell constituent units in the partial modules obtained by apparently dividing the above-mentioned module into five in the case where the module was operated at a constant current density of 0.7 A/cm$^2$. In the 5 apparently divided modules, the partial module closest to the gas inlet was referred to as No.6a, followed by No.6b, No.6c, and No.6d, and the one closest to the gas outlet was referred to as No.6e.

In this case, since the cooling water flow amount was made comparatively small, there was a temperature distribution from the partial module No.6a to No.6e. When the current density was 0.7 A/cm$^2$, the average cell temperature of the 20 cell constituent units in the partial modules was 75.0° C. at No.6a, 76.0° C. at No.6b, 77.8° C. at No.6c, 80.8° C. at No.6d, and 82.0° C. at No.6e respectively, indicating that the temperature at the portion closer to the upstream parts of the gas flow became lower and the temperature at the portion closer to the downstream parts of the gas flow became higher. At this time, the temperature distribution from No.6a to No.6e was not linear one but one in the form of a curve opening downwards.

FIG. 7 indicates that when the current density was 0.7 A/cm$^2$, the characteristics of the partial module closer to the gas inlet were higher. However, the bubbler temperature dependence showed similar tendencies in any partial module, and the characteristics were extremely stable in all partial modules.

In general, on the air electrode side, there is an occurrence of generated water, so the steam partial pressure increases at the portion closer to the gas outlet. On the other hand, since the gas inlet has a higher pressure than the gas outlet due to the pressure loss at the gas inlet, there is an increase in the relative humidity at the gas inlet. However, in the present example, when the oxidizing gas bubbler temperature was 70° C., the pressure loss at the gas inlet was as low as 0.1 kg·f/cm$^2$, the effect of an increase in the steam partial pressure at the gas outlet due to the occurrence of generated water was more influential than an increase in the relative humidity at the gas inlet due to the pressure loss at the gas inlet. Therefore, the gas outlet side was inherently in the over flooding state, and the gas inlet side was in the over dry state. In contrast, the temperature distribution resulted in a relative increase in the temperature on the gas outlet side, which had the effect of suppressing the over flooding on the gas outlet side and suppressing the over dry on'the gas inlet side thereby giving stable-cell characteristics.

The relation between the bubbler temperature and the absolute values (V·ΔP) of the product of a gas flow rate (V) and the difference (ΔP) between a saturated steam pressure and an actual steam pressure in the vicinity of the gas inlet and in the vicinity of the gas outlet at a current density of 0.7 A/cm$^2$ is shown in Table 9.

TABLE 9

| Bubbler temperature (° C.) | | 30 | 40 | 50 | 55 | 60 | 65 |
|---|---|---|---|---|---|---|---|
| V · ΔP (kgf/sm) | Gas inlet | 26,000 | 20,000 | 15,000 | 12,000 | 10,000 | 8,000 |
| | Gas outlet | 30,000 | 22,000 | 17,000 | 14,000 | 11,000 | 10,000 |

From above, when the current density was 0.7 A/cm$^2$, the optimum range of the absolute value (V·ΔP) of the product of the gas flow rate (V) and the difference (ΔP) between the saturated steam pressure and the actual steam pressure according to the bubbler temperature in the vicinity of the gas inlet and in the vicinity of the gas outlet and was 8,000 to 30,000 kg·f/s·m. Under the condition, a performance distribution in a single plane of the cell could be minimized.

EXAMPLE 7

The same test as in Example 5 was conducted to find the bubbler temperature and the absolute values (V$^2$·ΔP and V·Δp$^2$) of the function of a gas flow rate (V) and the difference (ΔP) between a saturated steam pressure and an actual steam pressure in the vicinity of the gas inlet and in the vicinity of the gas outlet at a current density of 0.7 A/cm$^2$. The relation among these values is shown in Table 10.

TABLE 10

| Bubbler temperature (° C.) | | 30 | 40 | 50 | 55 | 60 | 65 |
|---|---|---|---|---|---|---|---|
| V$^2$ · ΔP (kgf/s$^2$) | Gas inlet | 395,000 | 376,000 | 324,000 | 287,000 | 236,000 | 140,000 |
| | Gas outlet | 467,000 | 457,000 | 439,000 | 386,000 | 360,000 | 306,000 |

TABLE 10-continued

| Bubbler temperature (° C.) | | 30 | 40 | 50 | 55 | 60 | 65 |
|---|---|---|---|---|---|---|---|
| V · ΔP$^2$ ((kgf)$^2$/ m$^3$ · s) | Gas inlet | 1.18 × 10$^8$ | 9.55 × 10$^7$ | 6.08 × 10$^7$ | 4.23 × 10$^7$ | 2.47 × 10$^7$ | 7.14 × 10$^6$ |
| | Gas outlet | 1.17 × 10$^8$ | 1.02 × 10$^8$ | 8.19 × 10$^7$ | 5.68 × 10$^7$ | 4.34 × 10$^7$ | 2.61 × 10$^7$ |

From the results shown in Table 10, when the current density was 0.7 A/cm$^2$, the optimal range of the bubbler temperature in the vicinity of the gas inlet and in the vicinity of the gas outlet and the absolute value (V$^2$·ΔP) of the function of the gas flow rate (V) and the difference (ΔP) between the saturated steam pressure and the actual steam pressure was about 140,000 to 470,000 kg·f/s$^2$. Furthermore, the optimal range of the absolute value (V·Δp$^2$) of the function of the gas flow rate (V) and the difference (ΔP) between the saturated steam pressure and the actual steam pressure was about 7×10$^6$–1.2×10$^8$ (kg·f) $^2$/m$^3$·s. Under the condition, a performance distribution (unevenness) in a single plane of the cell was able to be minimized.

EXAMPLE 8

The same test as in Example 5 was conducted to find a bubbler temperature in the vicinity of the gas inlet and in the vicinity of the gas outlet, the absolute values (V$^2$·ΔP, and V·Δp$^2$) of the function of a gas flow rate (V) and the difference (ΔP) between a saturated steam pressure and an actual steam pressure at a current density of 0.3 A/cm$^2$. The relation among these values is shown in Table 11.

TABLE 11

| Bubbler temperature (° C.) | | 40 | 50 | 60 | 65 | 70 |
|---|---|---|---|---|---|---|
| V$^2$ · ΔP (kgf/s$^2$) | Gas inlet | 86,000 | 51,000 | 42,000 | 27,000 | 400 |
| | Gas outlet | 146,000 | 114,000 | 96,000 | 87,000 | 17,000 |
| V · ΔP$^2$ ((kgf)$^2$/ m$^3$ · s) | Gas inlet | 6.35 × 10$^7$ | 1.94 × 10$^7$ | 1.02 × 10$^7$ | 3.38 × 10$^6$ | 650 |
| | Gas outlet | 1.35 × 10$^8$ | 6.98 × 10$^7$ | 3.88 × 10$^7$ | 2.64 × 10$^7$ | 857,000 |

From the results shown in Table 11, the optimum range of the absolute value (V$^2$·ΔP) of the function of the gas flow rate (V) and the difference (ΔP) between the saturated steam pressure and the actual steam pressure at a current density of 0.3 A/cm$^2$ according to the bubbler temperature in the vicinity of the gas inlet and in the vicinity of the gas outlet was about 15,000 to 150,000 kg·f/s$^2$. Furthermore, the optimum range of the absolute value (V·Δp$^2$) of the function of the gas flow rate (V) and the difference (ΔP) between the saturated steam pressure and the actual steam pressure was about 0.8×10$^6$ to 1.4×10$^8$ (kg·f) $^2$/m$^3$·s. Under the condition, a performance distribution (unevenness) in a single plane of the cell could be minimized.

INDUSTRIAL APPLICABILITY

It has been turned out that according to the present invention, a polymer electrolyte fuel cell can be operated with high performance in a stable manner by a function represented by a gas flow rate and the difference between a saturated steam pressure and an actual steam pressure, by regulating an in-plane temperature distribution obtained by a cooling water flow direction and by the regulations of a cooling water inlet temperature and a cooling water flow amount; a gas supply amount; a supplied moisture amount; and a current density of the polymer electrolyte fuel cell.

What is claimed is:

1. A method for operating a polymer electrolyte fuel cell comprising, a pair of electrodes sandwiching a polymer electrolyte membrane, a conductive separator, a means for supplying and discharging a fuel gas and an oxidizing gas to and from said electrodes, a moisturizing means for said fuel gas and/or said oxidizing gas, and a means for circulating cooling water in a plane direction parallel to said electrodes, said method comprising the steps of:

measuring at least one physical quantity selected from the group consisting of a gas flow rate of said fuel gas, a gas flow rate of said oxidizing gas, a saturated steam pressure in said fuel gas, a steam pressure in said fuel gas, a saturated steam pressure in said oxidizing gas, a steam pressure in said oxidizing gas, a temperature of said electrode and an output current value;

regulating at least one physical quantity selected from the group consisting of a flow direction of said cooling water, a temperature of said cooling water, a flow amount of said cooling water, a supply amount of said fuel gas, a supply amount of said oxidizing gas, a moisture amount in said fuel gas, a moisture amount in said oxidizing gas, a temperature of said electrode, a temperature distribution of said electrode and an output current value; and thereby maintaining a property value Y calculated by the formula (1):

$$Y = V^m \times (\Delta P)^n \quad (1)$$

wherein V indicates a flow rate of said fuel gas or said oxidizing gas, $\Delta P$ is the difference between a saturated steam pressure and a steam pressure in said fuel gas or said oxidizing gas and m and n are predetermined values, to be not less than a first predetermined value and not more than a second predetermined value;

wherein a temperature of an electrode starting point is made lower than a temperature of an electrode outlet point in said electrodes, said electrode starting point being a portion into which said fuel gas or said oxidizing gas is introduced and said electrode outlet point being a portion from which said fuel pas or said oxidizing gas is discharged; and wherein a temperature of said electrode from said electrode starting point to said electrode outlet point is changed against a distance from said electrode starting point to said electrode outlet point according to a curve opening downwards.

2. The method for operating polymer electrolyte fuel cell in accordance with claim 1, wherein an outlet of said fuel gas and said oxidizing gas in said polymer electrolyte fuel cell is made substantially open to an ordinary pressure excluding an inevitable pressure loss of a heat exchanger or a total enthalpy heat exchanger provided at the rear stage of said outlet.

3. The method for operating polymer electrolyte fuel cell in accordance with claim 1, wherein at least one selected from the group consisting of the first predetermined value, the second predetermined value, m and n is regulated depending on an operating duration of time or output characteristics of said polymer electrolyte fuel cell.

* * * * *